Dec. 25, 1934.　　　C. J. LEMONT　　　1,985,509
CABLE ANCHOR
Filed July 19, 1933
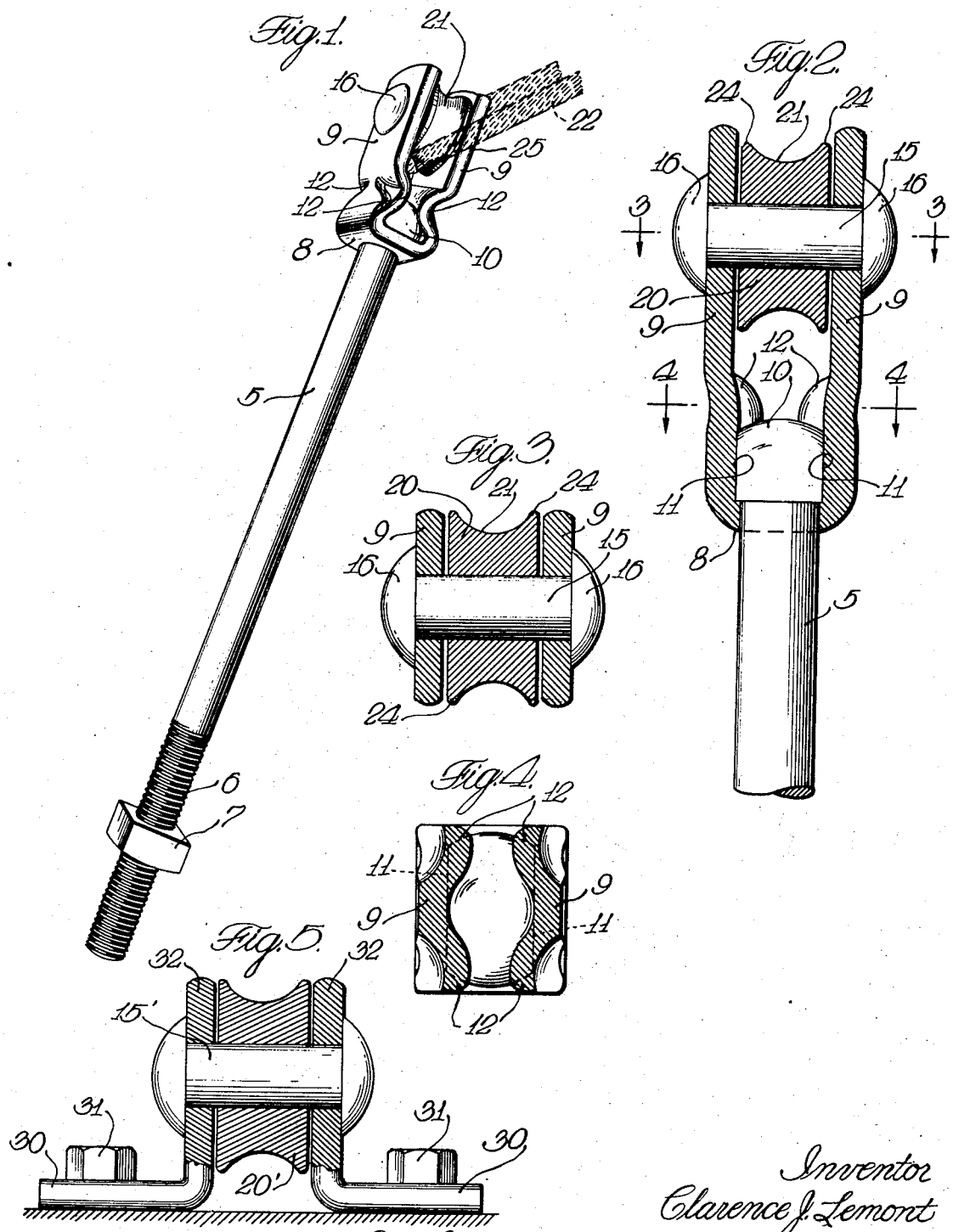
Inventor
Clarence J. Lemont
By Brown, Jackson, Boettcher & Dienner
Attys.

Patented Dec. 25, 1934

1,985,509

UNITED STATES PATENT OFFICE 1,985,509

CABLE ANCHOR

Clarence J. Lemont, South Milwaukee, Wis., assignor to Line Material Company, South Milwaukee, Wis., a corporation of Delaware Application July 19, 1933, Serial No. 681,083

7 Claims. (Cl. 24—123)

This invention relates to anchors for cables, messenger wires, guy wires and the like, and is particularly directed to anchoring means for supporting or securing wires or cables in a manner which will not subject the wire or cable to undue friction, abrasion or pinching stresses, or subject the same to the danger of crystallization.

It is customary, in anchoring cables or wires upon poles, structural members and the like, to provide an anchor member on the pole or structure, which is engaged by the guy wire or cable, the other end of the cable or wire being similarly secured to a similar anchor or to a ground anchor. The cable is tensioned in any desired manner, at the end or at both ends, in order to provide a proper supporting line for the suspended cable, pole or structure.

Heretofore anchor members for this service have generally been in the form of an eyelet. Where a guy wire is fastened to an earth anchor, it is, as a matter of practice, ordinarily impossible to aline the anchor member with respect to the ground anchor in such manner that a perfectly straight axial pull could be applied in tensioning the cable. This means that the cable is, in such cases, angularly displaced with respect to the axis of the eyelet support.

However, the use of an eyelet presents disadvantages in that a force larger than that necessary for tensioning the cable is required in order to overcome the friction stress occasioned by drawing the cable about the eyelet. Further, an eyelet is unsatisfactory in that it may not distribute the tension imparted to the cable equally upon both sides of the bight of the cable.

The use of a roller or sheave for the purpose of anchoring an end of the cable member has heretofore been suggested. All the previous attempts to employ a roller that I have seen have been unsatisfactory. Misalinement of the cable with respect to the roller results in wedging or pinching the cable between the roller and the supporting members, or in abrasion of the cable by its being carried over the relatively sharp flange of the roller.

I have, in the present invention, provided a structure which presents the advantageous features provided by the roller construction, such as controlling the radius to which the strand is bent, securing the rolling action, and preventing frictional stresses during the tensioning of the cable, while at the same time guarding the cable against injury to which it might be subjected due to inability to aline the cable with the plane of the roller.

In the preferred form of the present invention, I provide a roller or sheave adapted to receive the cable or guy wire, the roller being carried within supporting arms which, according to the present invention, are increased in width beyond that required for supporting purposes to secure a novel protecting action, and which have their edge surfaces smoothly rounded to assist in the same. I accomplish a two-fold purpose by forming these arms in this manner, firstly, I provide an additional supporting surface adjacent the flange of the roller which prevents pinching or wedging of the cable between the roller and the supporting arm, and secondly, by proper coordination between the size of the roller and the supporting arms, provide a continuous smoothly curved surface for supporting the cable, regardless of its angular displacement with respect to the roller. This curved surface, in fact, has a radius greater than the radius of the groove in the roller, and thus angular displacement of the cable does not require that it be bent to as small an arc as is necessary when it is actually in alinement. Thus, one of the main disadvantages of the roller construction is converted, by the present invention, into a most desirable feature. The rolling action is also preserved throughout all of the various positions which the cable may assume.

In one form of the present invention I mount the roller upon a pin or shaft extending through both arms of the supporting member, which is in the form of a clevis, the pin having its outer portions headed over to secure it in position. This serves the double purpose of preventing bending or spreading of the clevis arms, which possibly might result in wedging of the cable between the roller and the arm, and in providing a shaft subject to double shear, thus considerably strengthening the construction. Preferably the heads of this pin are made of relatively large diameter.

Another advantage secured by the present construction is that, by increasing the size of the supporting arms, material is made available for pinching over the head of a bolt or the like by which the clevis may be supported in position, preventing any relative axial or rotational movement therebetween. This is an optional feature, but is highly desirable to make the supporting bolt and the fitting mechanically integral.

Other objects, such as reduction in machining operations, economy in design, and increased efficiency of operation of such an anchor rod, will more fully appear from the following detailed description, which, taken in connection with the accompanying drawing, will disclose to those skilled in the art the particular construction and operation of a preferred form of my invention.

In the drawing:

Figure 1 is a perspective view of an anchor fitting mounted on a bolt or rod according to the present invention, with a diagrammatic showing of an angularly displaced cable trained thereabout;

Figure 2 is a sectional elevational view through the clevis, showing the manner in which the roller and the through bolt are supported thereby;

Figure 3 is a sectional view taken substantially on line 3—3 of Figure 2;

Figure 4 is a sectional view taken substantially on line 4—4 of Figure 2, showing in detail the engagement between the through bolt and the clevis; and Figure 5 is a partial sectional view of a modified form of the invention.

Referring now in detail to the drawing, the anchor shown in Figure 1 comprises a supporting bolt, indicated by the reference numeral 5, which is provided at its lower end with the threaded portion 6 adapted to receive the nut 7 by means of which the anchor is secured in position. The anchor is usually affixed to some support, such as a wall, structural member or the like, in a predetermined position.

The anchor bolt 5 is adapted to extend through the lower intermediate portion 8 of a substantially U-shaped clevis having the clevis arms 9, the intermediate portion 8 being provided with an opening through which the bolt 5 extends, as shown in detail in Figure 2. The bolt 5 is provided with a head portion indicated at 10, the head portion being provided with opposed flat or slabbed-off portions indicated at 11 in Figure 4, which are adapted to have abutting engagement with the inner surface of the supporting arms 9 of the clevis. It will be noted that the outer edges of the arms 9 are rounded for a purpose to be hereinafter described.

While the slabbed-off portions 11 of the head 10 of the bolt 5 are adapted to prevent rotation of the bolt 5 with respect to the clevis, and that may be sufficient for certain purposes, I have provided in this specific construction additional means, shown in Figures 1, 2 and 4, to prevent relative axial movement between these members. I accomplish this by providing crimped portions 12 on the arms 9 which are adapted to be bent inwardly and over the exterior surface of the bolt head 10, in order to engage the same for preventing axial movement between the bolt head and the clevis. These portions may be crimped inwardly in any desired manner, and serve to engage the bolt head 10 in such manner that movement of the bolt 5 with respect to the clevis is positively prevented. The relatively greater width of the sides 9—9 facilitate this. Although I have shown but one method of bringing portions of the arms 9 into engagement with the bolt head, it is to be understood that the invention is not to be limited to this specific method, inasmuch as other means may be provided for producing the same result. The parts may be welded together.

Adjacent the upper portions of the arms 9 I provide a through pin, indicated at 15, which extends through the supporting arms 9 of the clevis, and has headed portions 16 engaging the outer surface thereof for holding the pin 15 in position. These heads preferably are large to give good support to the sides 9—9. It will thus be noted that the pin 15 is supported by each of the arms 9, and is securely held in position by means of the headed portions 16 which engage the outer surfaces of the arms 9.

The pin 15 is adapted to support a roller member indicated generally at 20, the roller member 20 being provided with a central concaved portion or groove 21 adapted to receive a cable, guy wire, or the like, incidated at 22. The cable 22 may be a stranded wire cable, or any other type of flexible tension member which it is desired to anchor by means of the present invention.

It will be noted that the groove 21 is defined by opposed annular flange portions 24, which define the outer peripheral limits of the roller 20, and which are relatively thin with respect to the axis of the roller, as compared to their peripheral extent, so as to bring the surface of the roller approximately into tangency with the surface of the sides 9—9.

It will also be noted that the roller 20 has a slight amount of side play with respect to the arms 9, and also is loosely mounted upon the pin 15 for the purpose of preventing binding.

In the practical operation of the present invention, the anchor bolt 5 is secured in position, and a cable, such as cable 22, is then trained about the roller 20, the cable end being lapped about the roller in the groove 21 and then being suitably secured to tension the cable 22 in position. It is obvious that the anchor rod roller may be used for supporting a messenger wire or any other type of cable.

While in practice the cable should extend in the plane of the pulley 21, there are situations in which the cable may be angularly displaced with respect to the plane of the pulley, as diagrammatically indicated in Figure 1. Such instances occur when the bolt is fixed in a definite position in a wall or other supporting member, with the cable extending diagonally thereto. In prior types of anchor rods of which I am aware, this angular displacement caused the cable to bear upon the projecting flange portions of the roller, which resulted in abrasion, punching, or cutting of the cable.

By suitable coordination between the roller 20 and the clevis arms 9, however, I am able to provide for a substantially smooth curved bearing surface upon which the cable 22 is supported, comprising a portion of the groove 21, the side and top of flange 24 and the rounded surface at the edge of the clevis arm 9, indicated at 25 in Figure 1. Thus, angular displacement of the cable causes the cable to have bearing support along a smooth curved surface, with no sharp edges to contact therewith, and because of the side play in the roller, together with the coordination described, no crimping, cutting or wedging of the cable between the roller and the clevis arm is possible. This coordination is effected by making the relative diameter of the flange portion of the roller of such proportions with respect to the periphery of the clevis arms and by controlling the thickness and shaping the edges of the arms in such manner that a smooth substantially continuously curved surface of adequate extent is provided. In the instant embodiment it will be noted that a roller having an outer peripheral diameter substantially equal to the width of the clevis arms is employed. The arms are relatively thick and present no sharp corners to the cable.

A further advantage of the present structure resides in providing the through pin 15 supported by each of the arms 9. In this manner, the pin 15 is placed in double shear, and tension upon the roller 20, occasioned by the cable 22 being trained thereabout, can be increased, since the pin 15 can stand considerably more stress when placed in double shear than when in single shear.

It is thus apparent that according to this construction I have provided a simple, economical and compact anchor, which, without the use of extraneous locking means or machining operations, is adapted to provide a rigid anchor bolt and clevis unit having a roller which will not cause damage to the cable if the cable is displaced angularly with respect thereto.

In Figure 5 I have disclosed another embodiment of the invention, in which the anchoring means for the cable is formed by providing a pair of complementary bracket members, indicated at 30, which are suitably secured to a supporting structure by means of bolts or screws 31 passing through slots or holes through the base portions. The upstanding portions 32 of the bracket members 30 are adapted to receive a through pin 15', corresponding to pin 15 of Figures 2 and 3. The pin 15' supports a roller 20', corresponding to roller 20 of Figures 1 to 3, inclusive, which receives a cable, such as the cable 22. The relative proportions of the roller 20' and bracket arms 32 is such as to produce the non-abrasive and non-crimping action described in connection with the angular displacement of the cable relative to the bracket. The brackets are in this case connected through the support to which they are attached. They may be formed in various shapes. Various combinations or multiples may be constructed in a manner which will be apparent to those skilled in the art.

Obviously, any suitable means for fixedly attaching the anchor to a pole, building or other support may be employed. It is because the anchor cannot aline itself with the pull of the cable that the provision for smooth and low-friction support of the cable at an angle to the plane of the pulley is of such great value.

I do not intend to be limited to the specific details of the embodiments of the invention herein illustrated, but intend to include all forms coming within the spirit of the invention which is intended to be covered by the appended claims.

I claim:

1. A device of the class described comprising an elongated anchor bolt having a bolt head, said head being provided with oppositely slabbed-off portions, a U-shaped clevis through which said bolt extends, the head of said bolt being disposed within said clevis, clevis arms extending past said bolt head and having portions thereof crimped about the outer surface of said head, a through pin extending between and supported by said arm, and a roller carried by said pin and having a grooved portion for receiving a cable, said grooved portion being defined by outer annular relatively thin flange portions, said roller being disposed substantially within the peripheral extent of said clevis whereby said cable at all times is supported by a substantially smooth curved surface.

2. A fitting for anchoring a guy wire comprising a pair of cheek pieces of flat bar stock having rounded edges, a transverse pin extending through said cheek pieces adjacent their outer ends, and a grooved roller journaled on said transverse pin, the roller being of a maximum width substantially equal to the sides of the cheek pieces and the groove extending substantially the full width of the face of the roller whereby the groove of the roller and the rounded edges of the cheek pieces present adjacent surfaces across which a guy wire may be drawn at an angle without being sharply bent, said cheek pieces being adapted, at their rear end, to have rigid non-swiveling connection to a stationary object and at their front end substantially to cover the end faces of the roller.

3. A fitting for anchoring a guy wire comprising a pair of cheek pieces consisting of relatively thin and wide wrought bar stock with rounded edges, a cross pin extending through said cheek pieces adjacent their front ends and being riveted over at its ends for rigidly holding said cheek pieces against spreading, a roller of a diameter not substantially greater than the cheek pieces journaled upon said pin, said roller having a groove for receiving and centering a guy wire, said groove extending across substantially the full width of the circular face of the roller, said groove and the rounded edges of the cheek pieces providing a relatively smooth non-chafing guide surface for a guy wire which is drawn off at an angle, said cheek pieces being adapted to be rigidly coupled to a non-swiveling support whereby it is possible for the guy wire to extend off at an angle from the fitting and be drawn across the edge of the roller and the cheek pieces without undergoing any sharp bends.

4. In a cable anchor, a guy rod in combination with a fitting, comprising a pair of flat relatively parallel arms, a portion connecting the arms provided with an aperture receiving an end of said rod, a pin connecting the arms remote from said portion, and a grooved roller rotatable on the pin, the groove extending substantially to the ends of the roller and the diameter of the ends of the roller being substantially coextensive with the width of the arms, whereby a cable extending at an angle relative to the axis of the rod will be subjected to a minimum abrading action.

5. In a cable anchor, a guy rod in combination with a fitting, comprising a pair of flat relatively parallel arms, a portion connecting the arms and provided with an aperture receiving an end of said rod, said rod having a head engaged with said portion between said arms, the arms adjacent said head being crimped to engage therewith, a pin connecting the arms remote from said portion and a grooved roller rotatable on the pin, the groove extending substantially to the ends of the roller and the diameter of the ends of the roller being substantially coextensive with the width of the arms.

6. In a device of the class described, the combination of a clevis, comprising a piece of uniform width of flat bar stock bent into substantially U-shape to provide parallel arms and a bottom portion, an anchor rod of a diameter approximately equal to the distance between the arms of the clevis extending through the bottom portion, said rod having a T-shaped head, the parts of the arms adjacent the bottom of the clevis being indented over the T-shaped head to hold the clevis and bolt firmly together, a pulley disposed between the free ends of the arms, and a pin for supporting the pulley and holding the free ends of the arms together.

7. In a device of the class described, the combination of a clevis, comprising a piece of uniform width of flat bar stock bent into substantially U-shape to provide parallel arms and a bottom portion, an anchor rod of a diameter approximately equal to the distance between the arms of the clevis extending through the bottom portion, said rod having a T-shaped head, the parts of the arms adjacent the bottom of the clevis being indented over the T-shaped head to hold the clevis and bolt firmly together, and a pin extending through the free ends of the arms.

CLARENCE J. LEMONT.